US012665873B2

(12) United States Patent
Sundararajan et al.

(10) Patent No.: US 12,665,873 B2
(45) Date of Patent: *Jun. 23, 2026

(54) NAT ROUTE DISTRIBUTION BASED ON TAG INFORMATION IN AN SDWAN OVERLAY NETWORK

(71) Applicant: Cisco Technology, Inc., San Jose, CA (US)

(72) Inventors: Balaji Sundararajan, Fremont, CA (US); Ajeet Pal Singh Gill, Fremont, CA (US); Sampath Sthothra Bhasham, Santa Clara, CA (US); Satish Kumar Mahadevan, San Ramon, CA (US); Madhusudan V. Gindi, Sunnyvale, CA (US); Tahir Ali, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/909,072

(22) Filed: Oct. 8, 2024

(65) Prior Publication Data

US 2025/0126091 A1     Apr. 17, 2025

Related U.S. Application Data

(63) Continuation of application No. 18/484,897, filed on Oct. 11, 2023, now Pat. No. 12,199,942.

(51) Int. Cl.
| | |
|---|---|
| *G06F 15/16* | (2006.01) |
| *H04L 12/46* | (2006.01) |
| *H04L 61/256* | (2022.01) |

(52) U.S. Cl.
CPC ........ H04L 61/256 (2013.01); H04L 12/4641 (2013.01)

(58) Field of Classification Search
CPC .............. H04L 12/4641; H04L 61/256; H04L 61/2514
USPC .................... 709/245, 200–202, 3, 217–219
See application file for complete search history.

(56) References Cited

U.S. PATENT DOCUMENTS

| | | | |
|---|---|---|---|
| 6,711,171 B1 | 3/2004 | Dobbins et al. | |
| 7,155,740 B2 * | 12/2006 | Brustoloni | .......... H04L 61/2578 370/392 |
| 7,313,145 B1 * | 12/2007 | Bradd | ................. H04L 61/2567 370/401 |
| 7,327,721 B2 * | 2/2008 | Balasaygun | ........ H04L 65/1106 370/352 |

(Continued)

*Primary Examiner* — Moustafa M Meky
(74) *Attorney, Agent, or Firm* — Polsinelli P.C.

(57) ABSTRACT

A process can include determining a plurality of Network Address Translation (NAT) routes associated with respective edge routers included in a same virtual private network (VPN) for communicating with a software-defined wide area network (SDWAN). A process can include identifying a first subset of the plurality of NAT routes as mapped to a first public NAT address included in a NAT pool associated with the VPN. A process can include tagging each NAT route of the first subset with a tag value indicative of a preferred router for receiving return traffic of the respective NAT route. A process can include routing traffic on a respective NAT route of the plurality of NAT routes based on applying, at an SDWAN controller, a corresponding control policy matching the tag value of the respective NAT route.

20 Claims, 8 Drawing Sheets

(56)  References Cited

U.S. PATENT DOCUMENTS

| | | | |
|---|---|---|---|
| 7,380,000 B2 * | 5/2008 | Yaqub | H04W 36/005 |
| | | | 709/227 |
| 7,720,076 B2 | 5/2010 | Dobbins et al. | |
| 7,814,541 B1 | 10/2010 | Manvi | |
| 7,873,826 B2 * | 1/2011 | Cho | H04L 12/4641 |
| | | | 455/511 |
| 8,023,515 B2 | 9/2011 | Dobbins et al. | |
| 8,462,794 B2 | 6/2013 | Dobbins et al. | |
| 8,498,223 B2 * | 7/2013 | Kavanaugh | H04L 63/0272 |
| | | | 709/227 |
| 8,549,616 B2 * | 10/2013 | Gerber | H04L 45/033 |
| | | | 726/15 |
| 8,665,887 B2 | 3/2014 | Ge et al. | |
| 8,908,698 B2 * | 12/2014 | Aguayo | H04L 12/4633 |
| | | | 370/395.53 |
| 9,118,495 B1 * | 8/2015 | Hankins | H04L 12/4641 |
| 9,426,154 B2 | 8/2016 | Fitzgerald et al. | |
| 9,509,662 B2 * | 11/2016 | Mudigonda | H04L 61/35 |
| 9,575,798 B2 * | 2/2017 | Terayama | H04L 12/4641 |
| 9,917,849 B2 | 3/2018 | Bitton et al. | |
| 10,135,677 B1 * | 11/2018 | Hankins | H04L 12/4633 |
| 10,177,957 B1 * | 1/2019 | Hankins | H04L 63/0272 |
| 10,313,202 B2 * | 6/2019 | Lindsey | H04L 12/4641 |
| 10,469,324 B2 | 11/2019 | Cook et al. | |
| 10,601,705 B2 * | 3/2020 | Hira | H04L 45/745 |
| 10,931,560 B2 * | 2/2021 | Goliya | H04L 45/02 |
| 11,095,523 B2 | 8/2021 | Cook et al. | |
| 11,575,714 B2 * | 2/2023 | Weiss | H04W 12/086 |
| 11,606,337 B2 * | 3/2023 | Li | H04L 12/4633 |
| 12,199,942 B1 * | 1/2025 | Sundararajan | H04L 61/256 |
| 12,341,696 B2 * | 6/2025 | Kaciulis | H04L 12/4641 |
| 2011/0286466 A1 | 11/2011 | Ge et al. | |
| 2016/0359853 A1 | 12/2016 | Fitzgerald et al. | |
| 2018/0152448 A1 | 5/2018 | Fitzgerald et al. | |
| 2018/0167320 A1 | 6/2018 | Huang et al. | |
| 2019/0379600 A1 | 12/2019 | Bisht et al. | |
| 2021/0377126 A1 | 12/2021 | Cook et al. | |
| 2022/0263791 A1 | 8/2022 | Brar et al. | |
| 2023/0046070 A1 | 2/2023 | Panchalingam et al. | |
| 2023/0106234 A1 | 4/2023 | Heranjal et al. | |

* cited by examiner

600 —

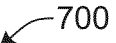

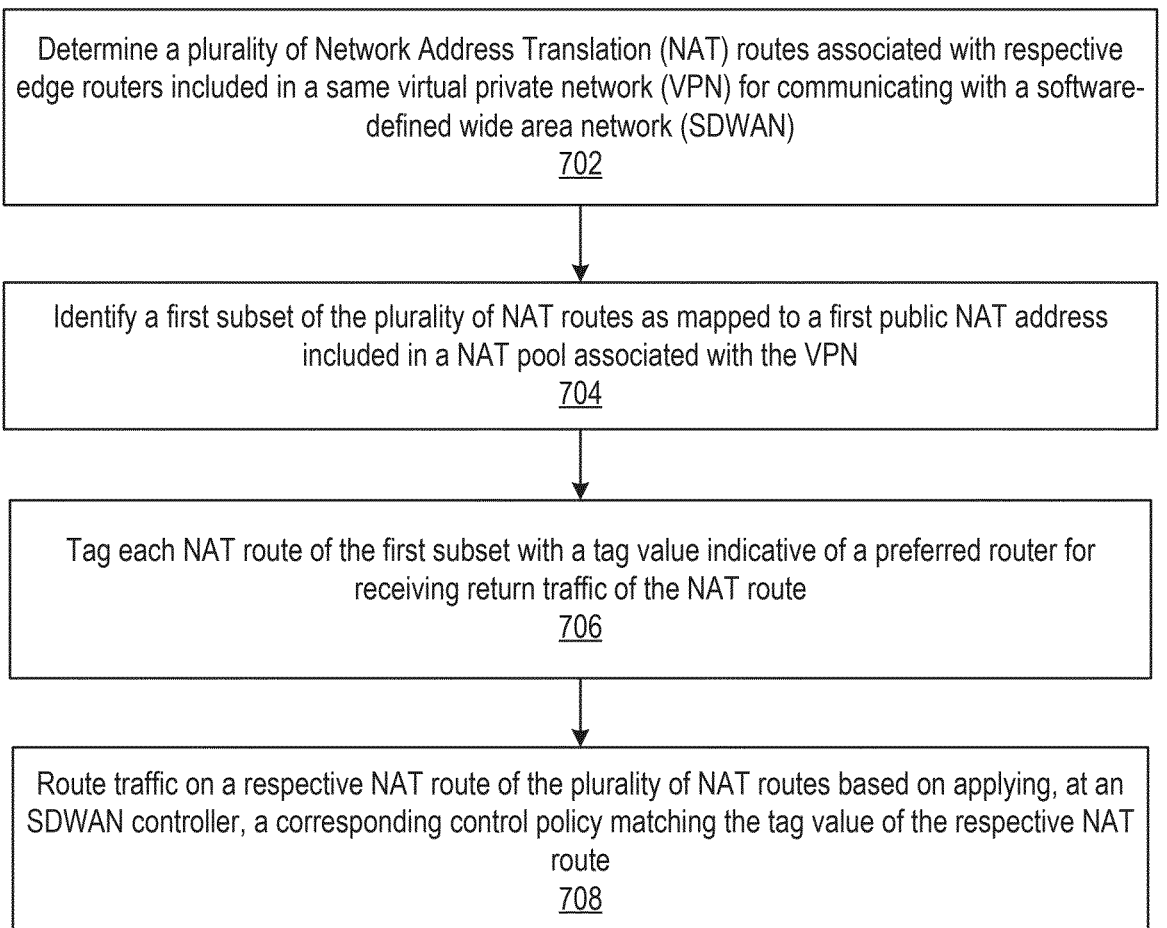

Determine a plurality of Network Address Translation (NAT) routes associated with respective edge routers included in a same virtual private network (VPN) for communicating with a software-defined wide area network (SDWAN)
702

Identify a first subset of the plurality of NAT routes as mapped to a first public NAT address included in a NAT pool associated with the VPN
704

Tag each NAT route of the first subset with a tag value indicative of a preferred router for receiving return traffic of the NAT route
706

Route traffic on a respective NAT route of the plurality of NAT routes based on applying, at an SDWAN controller, a corresponding control policy matching the tag value of the respective NAT route
708

FIG. 7

NAT ROUTE DISTRIBUTION BASED ON TAG INFORMATION IN AN SDWAN OVERLAY NETWORK

CROSS REFERENCE TO RELATED APPLICATIONS

This application is a continuation of U.S. patent application Ser. No. 18/484,897 filed on Oct. 11, 2023, the content of which is incorporated by reference in its entirety.

TECHNICAL FIELD

The present technology generally relates to the field of computer networking, and more particularly, to systems and techniques for symmetric routing based on Network Address Translation (NAT) route tagging in a Software-Defined Wide Area Network (SDWAN) overlay network.

BACKGROUND

Software defined networking (SDN) was developed to provide various advantages over traditional Wide Area Networks (WANs). For instance, SDWANs may provide methods for prioritizing critical network traffic and take advantage of Internet broadband connections to connect directly to multi-cloud resources. Further, SDWANs may simplify the management of WAN fabrics with controller-first overlays that are independent of transport layers (e.g., MPLS, Ethernet, Internet, Long-Term Evolution (LTE) networks, 5G networks, etc.). SD-WAN controllers may be configured to choose among the available transport mediums to deliver optimal application performance as defined through service level agreements (SLAs).

In SDWAN deployments, an SDWAN controller is responsible for selecting and distributing overlay routes belonging to different address families (e.g., TRANSPORT routes, unicast routes, etc.) to edge network devices (e.g., edge routers, etc.). The SDWAN controller learns of the routes attached to a first edge network device by receiving overlay management protocol (OMP) reports from the edge network device. The SDWAN controller then selects a number of the routes attached to the first edge network device for distribution to second edge network devices in the SDWAN. The SDWAN controller selects a limited number of these routes at random, up to a configurable limit, called a send-path-limit.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which:

FIG. 7 illustrates a flowchart diagram for a process of wireless communications, in accordance with some aspects of the present technology.

DETAILED DESCRIPTION

Figure 1:
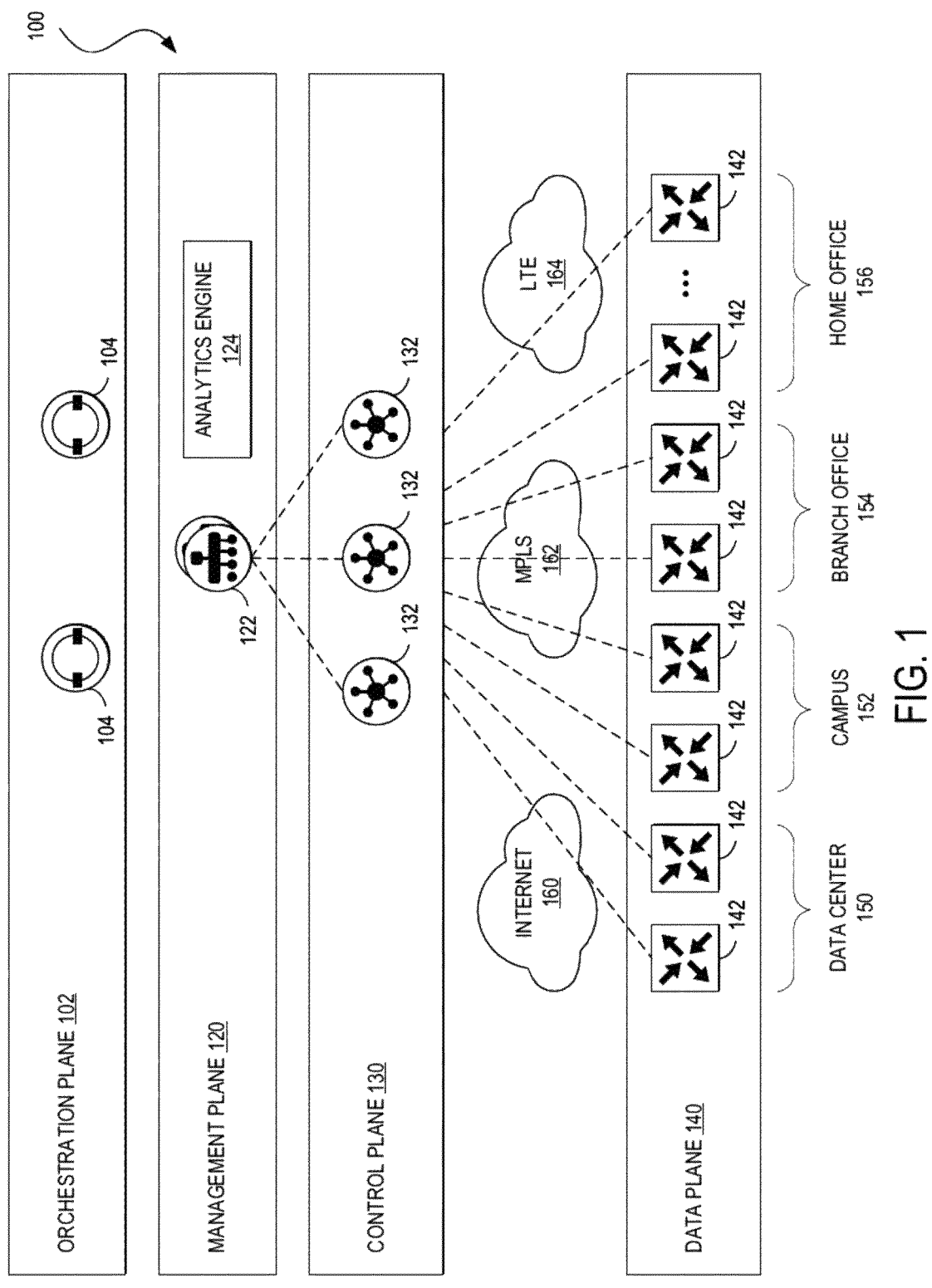
FIG. 1 illustrates an example of a network architecture for implementing aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

OVERVIEW

Disclosed are systems, apparatuses, methods, and computer-readable media for wireless communications. In one illustrative example, a method is provided, the method comprising: determining a plurality of Network Address Translation (NAT) routes associated with respective edge routers included in a same virtual private network (VPN) for communicating with a software-defined wide area network (SDWAN); identifying a first subset of the plurality of NAT routes as mapped to a first public NAT address included in a NAT pool associated with the VPN; tagging each NAT route of the first subset with a tag value indicative of a preferred router for receiving return traffic of the NAT route; and routing traffic on a respective NAT route of the plurality of NAT routes based on applying, at an SDWAN controller, a corresponding control policy matching the tag value of the respective NAT route.

In some aspects, each NAT route associated with a particular public NAT address included in the NAT pool is tagged with a tag value uniquely corresponding to an identity of the respective edge router configured as a source of the NAT route.

In some aspects, each NAT route associated with a particular local site of a plurality of local sites is tagged with a tag value uniquely corresponding to an identity of the respective edge router configured as a source of the NAT route.

In some aspects, NAT route tag values are not reused within a same local site of the VPN or SDWAN, and wherein NAT route tag values are reused across different local sites of the VPN or SDWAN.

In some aspects, tagging each NAT route includes: appending a respective tag value that is locally unique within a local site of a source edge router corresponding to each NAT route; and distributing overlay management protocol (OMP) information indicative of aggregate NAT route prefix information and respective tag value information.

In some aspects, the first subset of the plurality of NAT routes comprises NAT routes associated with respective edge routers included in a same local site of the VPN or SDWAN.

In some aspects, a corresponding tag value is appended to each NAT route of the plurality of NAT routes, the corresponding tag value indicative of a control policy for selective import or export to one or more remote sites.

In some aspects, a corresponding tag value is appended to each aggregate prefix of one or more aggregate prefixes determined for the first subset of NAT routes, and wherein the one or more aggregate prefixes are determined based on shared tag values.

In another illustrative example, a system is provided, the system comprising: one or more processors; and one or more computer-readable storage media having computer-readable instructions stored thereon, wherein the computer-readable instructions, when executed by the one or more processors, cause the one or more processors to: determine a plurality of Network Address Translation (NAT) routes associated with respective edge routers included in a same virtual private network (VPN) for communicating with a software-defined wide area network (SDWAN); identify a first subset of the plurality of NAT routes as mapped to a first public NAT address included in a NAT pool associated with the VPN; tag each NAT route of the first subset with a tag value indicative of a preferred router for receiving return traffic of the NAT route; and route traffic on a respective NAT route of the plurality of NAT routes based on applying, at an SDWAN controller, a corresponding control policy matching the tag value of the respective NAT route.

In another illustrative example, one or more non-transitory computer-readable media are provided comprising computer-readable instructions, which when executed by one or more processors, cause the one or more processors to: determine a plurality of Network Address Translation (NAT) routes associated with respective edge routers included in a same virtual private network (VPN) for communicating with a software-defined wide area network (SDWAN); identify a first subset of the plurality of NAT routes as mapped to a first public NAT address included in a NAT pool associated with the VPN; tag each NAT route of the first subset with a tag value indicative of a preferred router for receiving return traffic of the NAT route; and route traffic on a respective NAT route of the plurality of NAT routes based on applying, at an SDWAN controller, a corresponding control policy matching the tag value of the respective NAT route.

Example Embodiments

The present technology addresses the need in the art for providing symmetric networking in software-defined networking (SDWAN) deployments and/or overlay network deployments that utilize Network Address Translation (NAT) route distribution. For instance, the present technology addresses the need to provide symmetric networking between a remote site (e.g., associated with service side NAT) and a client site (e.g., associated with client side NAT), where the NAT pool addresses are not unique within a virtual private network (VPN) across all of the client sites in the SDWAN network.

NAT route distribution can be used to distribute NAT public addresses (e.g., selected from a NAT pool comprising a plurality of NAT public addresses) from client sites to remote sites using Overlay Management Protocol (OMP) or Border Gateway Protocol (BGP). NAT route distribution is widely used in SDWAN infrastructures to attract return traffic from remote locations (e.g., return traffic from the remote site to the client site). NAT route distribution maps multiple private addresses inside a local network (e.g., client site) to a single/shared public IP address, before their traffic is transferred onto the internet.

The NAT route distribution technique works effectively to facilitate the attraction of return traffic from remote sites, only so long as the NAT pool addresses remain unique within the virtual private network (VPN) that spans across all the client sites in the SDWAN (e.g., all the client sites associated with the same enterprise user or tenant, etc.). As large-scale SDWAN deployments become increasingly common (e.g., with 1,000+ branches and 8,000+ edge devices), it becomes impractical to maintain the uniqueness of the NAT addresses within a VPN. When non-unique NAT pool addresses are utilized (e.g., when NAT pool addresses are re-used), these NAT addresses can be referred to as "overlapping" NAT addresses. Maintaining the uniqueness of the NAT addresses within a VPN requires preventing reuse of NAT addresses and/or preventing overlapping NAT addresses. In particular, when an enterprise user has many edge routers with overlapping NAT addresses, the existing approach of automatic distribution of NAT public addresses will result in route conflicts, and the automatic NAT public address distribution will fail due to next hop route conflicts.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can include an analytics engine 124 to provide analytics for the network.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

Figure 2:
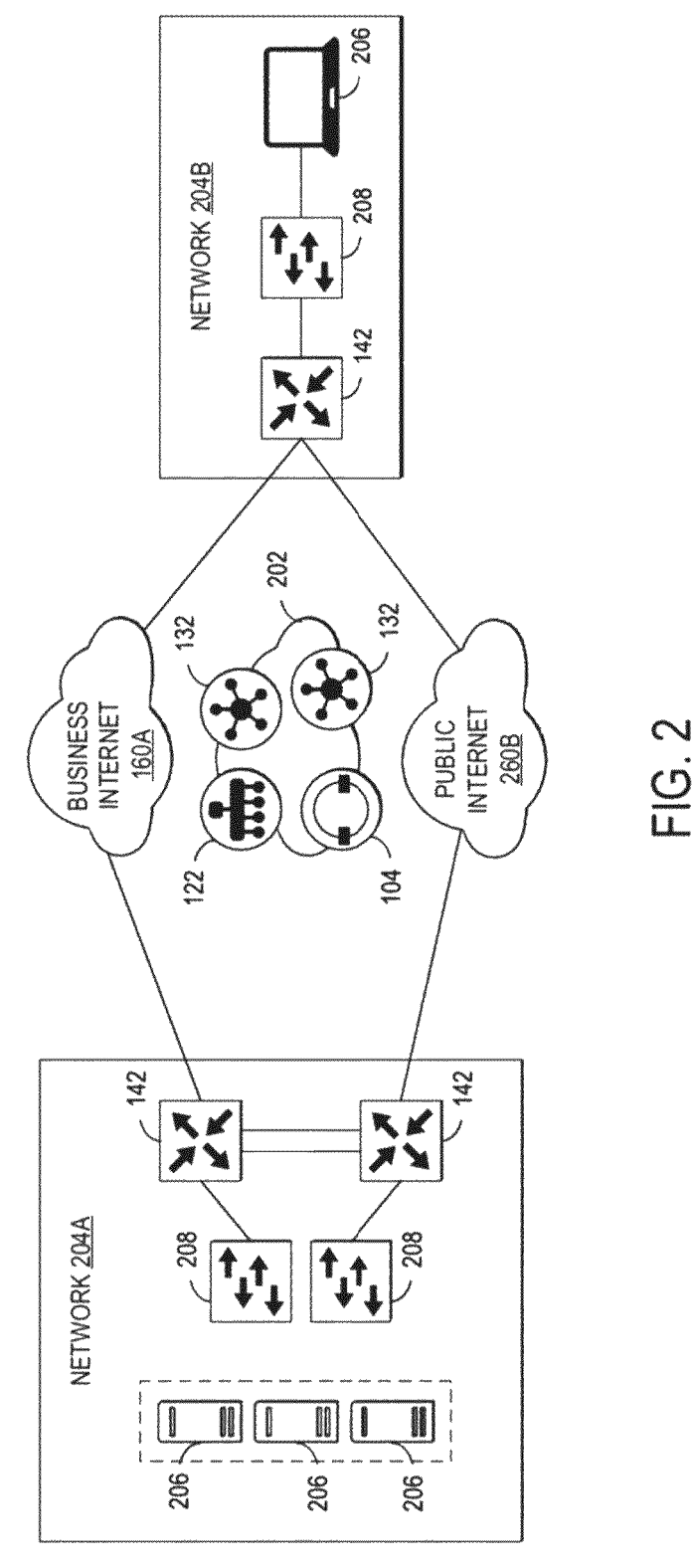
FIG. 2 illustrates an example of a network topology, in accordance with some aspects of the present technology.

FIG. 2 illustrates an example of a network topology 200 for showing various aspects of the network architecture 100. The network topology 200 can include a management network 202, network sites 204A and 204B (collectively "network sites 204" hereinafter) (e.g., the data center(s) 150, the campus network(s) 152, the branch office network(s) 154, the home office network(s) 156, cloud service provider network(s), etc.), and Internet transport networks 160A and 160B (collectively "Internet transport networks 160" hereinafter). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., MPLS, private1, biz-internet, metro-ethernet, LTE, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s)

132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 5G, biz, internet, blue, bronze, custom1, custom2, custom3, default, gold, green, LTE, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
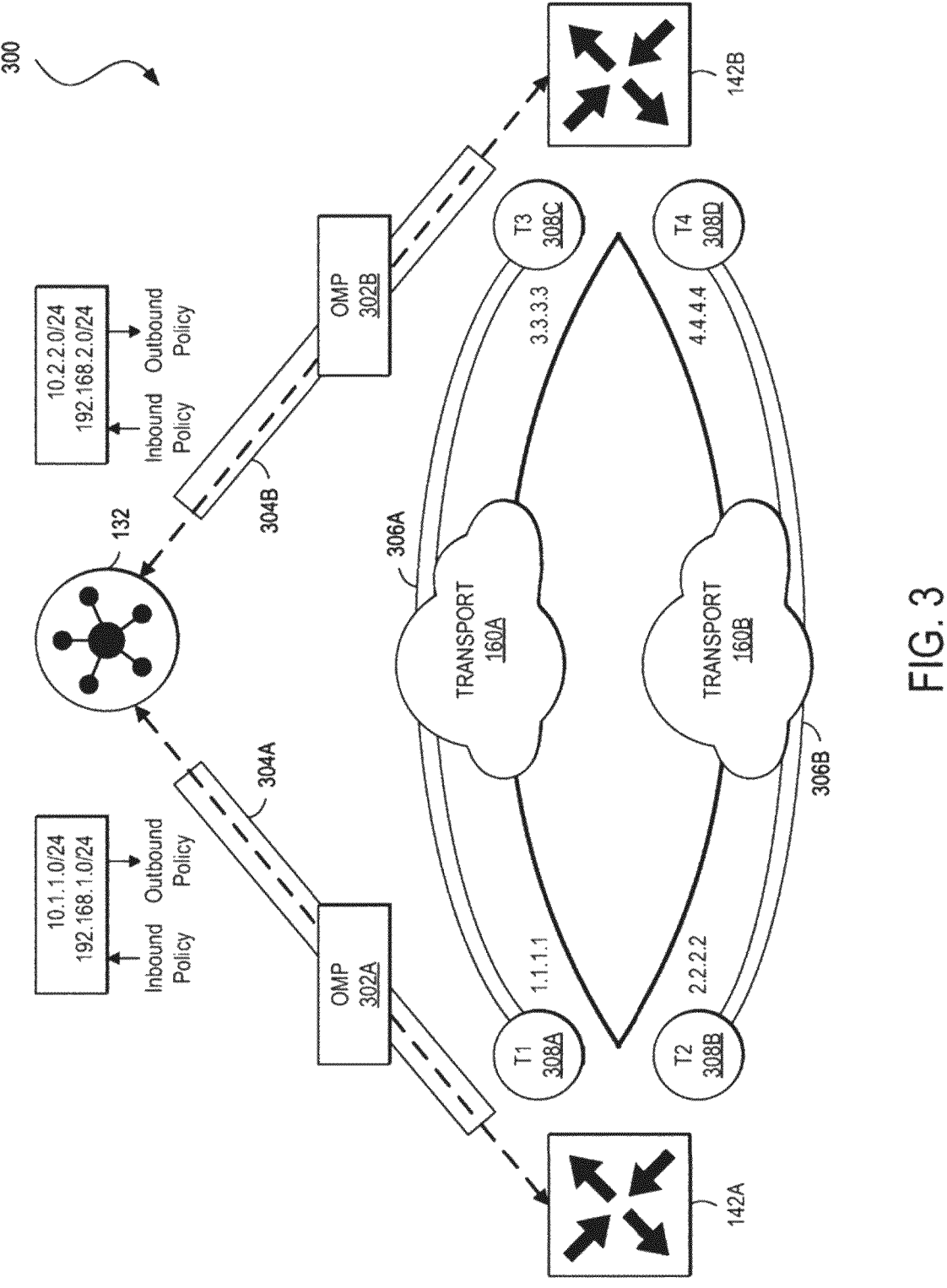
FIG. 3 is a diagram illustrating an example operation of a protocol for managing an overlay network, in accordance with some aspects of the present technology.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise various types of routes. For example, OMP can advertise OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can be similar to a BGP next-hop IP address) and other attributes such as origin, originator, preference, site identifier, tag, and virtual private network (VPN). An OMP route may be installed in the forwarding table if the TLOC to which it points is active.

In another example, OMP can advertise TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

In another example, OMP can advertise service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
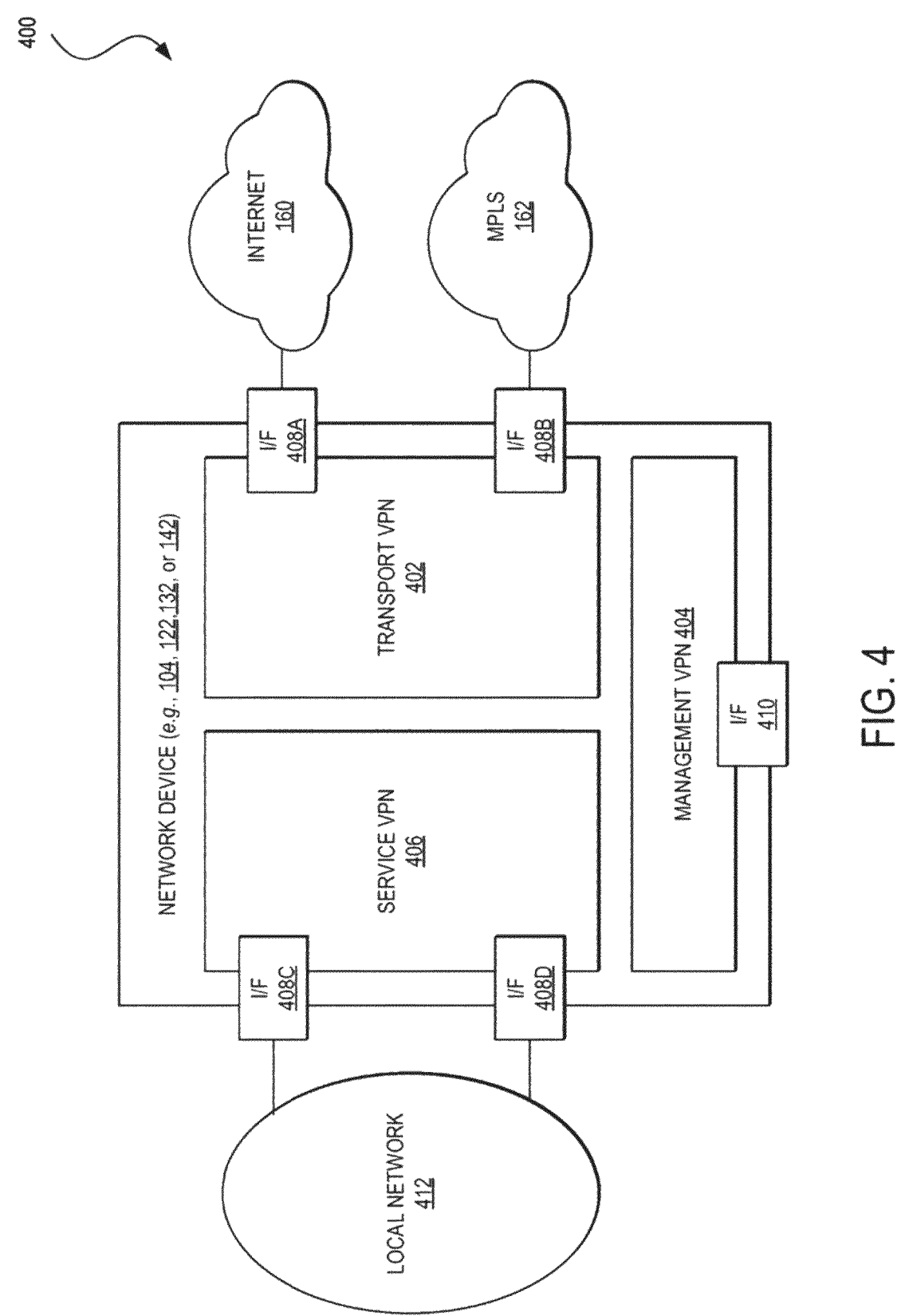
FIG. 4 is a diagram illustrating an example operation of virtual private networks for segmenting a network, in accordance with some aspects of the present technology.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QOS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively "network interfaces 410" hereinafter) are shown to be physical interfaces in this example, one of ordinary skill in the art will appreciate that the interfaces 410 in the transport and service VPNs can also be sub-interfaces instead.

Figure 5:
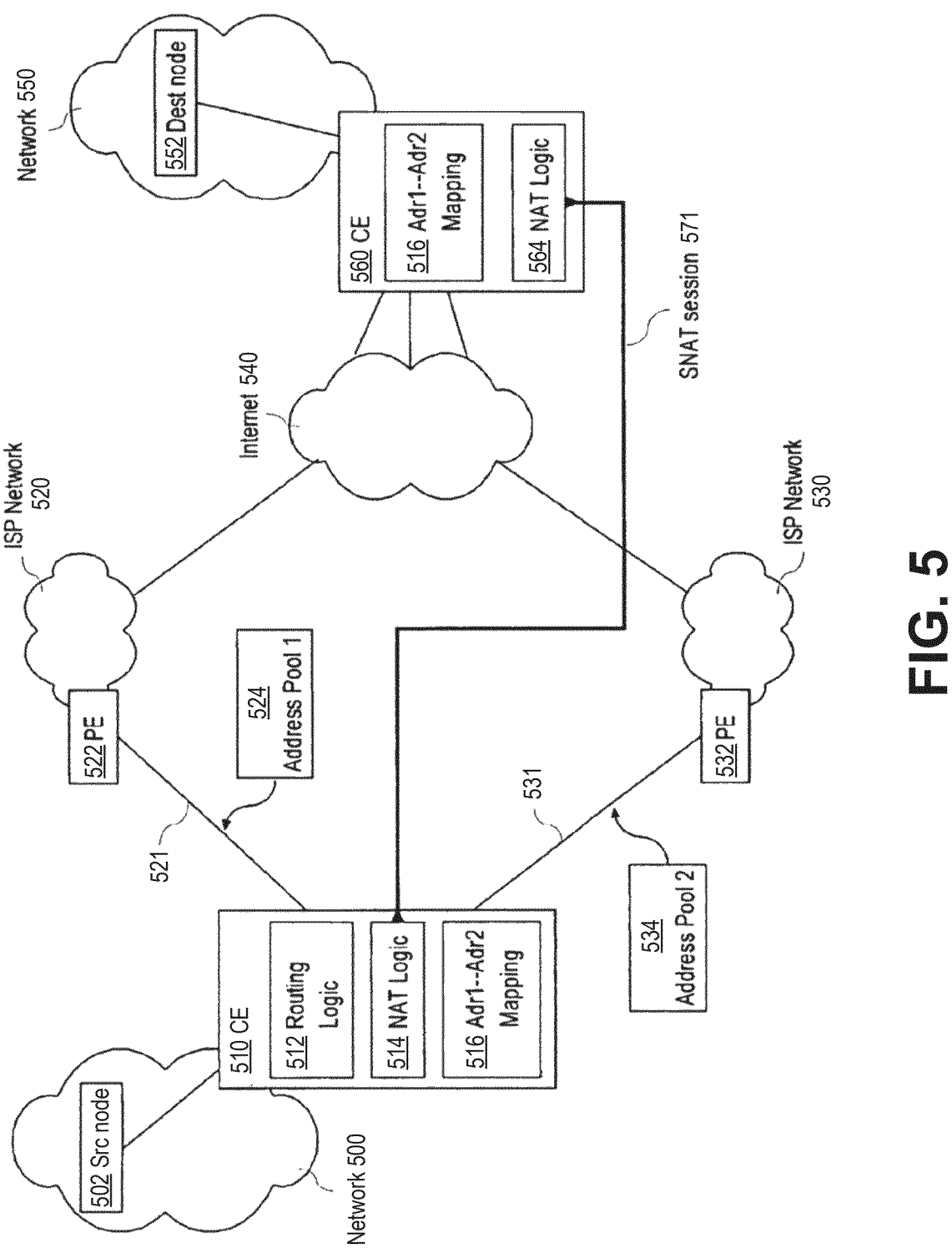
FIG. 5 illustrates an example network deployment associated with one or more Network Address Translation (NAT) pools, in accordance with some aspects of the present technology.

FIG. 5 illustrates an example embodiment in an example operational context. Network 500 is a customer network that is communicatively connected to Internet 540 and/or to other networks through provider networks 520 and 530. For example, nodes in network 500 may communicate with nodes in network 550 by sending data over provider network 520 or 530 and over Internet 540. In some network deployments, provider networks 520 and 530 may be managed and operated by the same ISP provider. In other network deployments, provider networks 520 and 530 may be managed and operated by two separate and different network providers. The techniques for optimizing return traffic paths described herein do not depend on the ISP provider or providers that operate networks 520 and 530 so long as networks 520 and 530 are associated with separate sets of globally reachable IP addresses.

According to the techniques described herein, customer edge (CE) router 510 is configured at the edge of network 500 and is operable to function as a gateway for network traffic sent from nodes in network 500 to other networks and for network traffic received from other networks for the nodes in network 500. Similarly, CE router 560 is configured at the edge of network 550 and is operable to function as a gateway for network traffic sent from nodes in network 550 to other networks and for network traffic received from other networks for the nodes in network 550. As used herein, "node" refers to any network infrastructure element, end station, host, computer system, or other apparatus that is communicatively connected in a network and that comprises hardware components and/or software components operable to provide one or more functionalities.

In the operational context of FIG. 5, CE router 510 is configured as a multi-homed network infrastructure element operable to function as a gateway for traffic send to and from network 500. CE router 510 is assigned one or more IP addresses that are local for network 500. CE router 510 is also assigned a plurality of different IP addresses through which CE router 510 may be reached from each of provider networks 520 and 530 over network connections 521 and 531, respectively. As used herein, "connection" refers to a logical and/or physical link over which a node in one network may communicate according to a particular protocol with one or more nodes in the same or a different network.

For example, the operational context of FIG. 5 illustrates packet-switched IP networks in which the connections between network infrastructure elements in the networks are logical links identified by IP addresses. In this example operational context, CE router 510 may be assigned one or more IP addresses in address pool 524, where provider edge (PE) router 522 in provider network 520 is operable to forward IP packets to each IP address in this address pool. Thus, CE router 510 and PE router 522 are communicatively connected over network connection 521, and network connection 521 is associated with each IP address in address pool 524. Similarly, CE router 510 may be assigned one or more IP addresses in address pool 534, where PE router 532 in provider network 530 is operable to forward IP packets to each IP address in this address pool. Thus, CE router 510 and PE router 532 are communicatively connected over network connection 531, and network connection 531 is associated with each IP address in address pool 534.

CE router 510 comprises routing logic 512 and NAT logic 514. CE router 510 may further comprise other components that are not shown in FIG. 5 such as, for example, an Operating System (OS), a plurality of network interfaces, and one or more forwarding logic components that are operable to facilitate a forwarding functionality on the plurality of interfaces. Depending on the architecture of CE router 510, in some embodiments routing logic 512 and NAT logic 514 may be implemented as one or more software and/or hardware components that may operate under the control of an OS of the router. In other embodiments, routing logic 512 and NAT logic 514 may be implemented on a blade that is operatively coupled to the backplane of CE router 510. In various embodiments, routing logic 512 and NAT logic 514 may be implemented as one or more software components that are executable by one or more processors, as one or more hardware components such as Application-Specific Integrated Circuits (ASICs), or as any combination of software and hardware components.

Routing logic 512 is operable to make routing decisions for traffic entering network 500. According to the techniques described herein, routing logic 512 is operable to optimize routing for inbound traffic that is received from provider networks 520 and 530. In addition, in some embodiments routing logic 512 may also be operable to optimize routing for outbound traffic that is sent from network 500 to provider networks 520 and 530.

NAT logic 514 is operable to perform network address translation for traffic entering and exiting network 500. For example, NAT logic 514 is operable to translate the source address in the source address field in outbound IP packets from the local IP address of the sending node in network 500 to an IP address from address pool 524 (if the outbound packets are sent to provider network 520) or to an IP address from address pool 534 (if the outbound packets are sent to provider network 530). For inbound IP packets, according to the techniques described herein NAT logic 514 is operable to: translate the destination address in a destination address field in the packets from one of an IP address in address pool 524 and an IP address in address pool 534 to the other of an IP address in address pool 524 and an IP address in address pool 534; and to translate the resulting destination address to the local IP address of the node in network 500 to which the packets are sent.

In operation, suppose that source node 502 in network 500 has established a TCP connection to destination node 552 in network 550. Suppose that source node 502 has the local IP address "S" in network 500, and destination node 552 has the local IP address "D" in network 550. Suppose also that CE router 560, which is operable as a gateway and provides connectivity for the nodes in network 550, is assigned the globally reachable IP address of "Y". (It is noted that the designations "S", "D", and "Y" are used herein for illustration purposes only. The actual local IP addresses of source node 502 and destination node 552 may be any valid IP addresses, such as, for example, "192.168.10.23" and "192.168.91.16", respectively. The actual globally reachable IP address of CE router 560 may be, for example, "66.7.224.15".)

In normal operation, a TCP/IP client in source node 502 generates IP packets that include segments of the TCP connection established between source node 502 and destination node 552. The IP packets are then routed over network 500 to CE router 510. When the IP packets are received at CE router 510, the source and destination address fields in the packets are as follows: src-ip: S; dest-ip: Y.

The destination address field in the IP packets is "Y" because the destination node 552 is behind the NAT logic 564 in CE router 560, which provides network address translation for nodes in network 550. Routing logic 512 determines or has previously determined that IP packets sent to network 550 are to be forwarded over connection 521 to network 520. Upon receipt of the IP packets from source node 502, NAT logic 514 translates the source address in the IP packets to the globally reachable IP address "X1", which is selected from address pool 524. (It is noted that the designation "X1" is used herein for illustration purposes only; the actual globally reachable IP address assigned to CE router 510 from address pool 524 may be, for example, "10.108.13.73".) Thus, when the IP packets received from source node 502 are sent out from CE router 510, the source and destination address fields in the packets are as follows: src-ip: X1; dest-ip: Y.

After NAT logic 514 has translated the source address in the IP packets to "X1", the packets are sent over connection 521 to network 520 and are subsequently forwarded over to Internet 540 and from there to CE router 560. When the IP packets are received at CE router 560, NAT logic 564 examines the packets and replaces the destination address in the packets with the IP address "D" of destination node 552. Thereafter, CE router 560 forwards the packets over network 550 to destination node 552. Thus, upon exit from CE router 560 and upon receipt at destination node 552, the source and destination address fields in the packets are as follows: src-ip: X1; dest-ip: D.

Since CE router 510 has translated the source address of the IP packets to "X1", any return IP packets from destination node 552 to source node 502 are going to be received at CE router 510 over connection 521 from provider network 520. For example, a TCP/IP client in destination node 552 generates return IP packets that include segments of the TCP connection established between source node 502 and destination node 552. The return IP packets are then routed over network 550 to CE router 560. When the return IP packets are received at CE router 560, the source and destination address fields in the packets are as follows: src-ip: D; dest-ip: X1.

NAT logic 564 translates the source address in the return IP packets to the globally reachable IP address "Y" of CE router 560. When the return IP packets are sent from CE router 560, the source and destination address fields in the packets are as follows: src-ip: Y; dest-ip: X1. CE router 560 then forwards the packets to the destination address "X1"

over Internet 540. Since the destination address of the return IP packets is "X1", the return IP packets are routed over network 520 and connection 521 to CE router 510. When the return IP packets are received at CE router 510, NAT logic 514 translates the destination address in the packets to the local IP address "S" of source node 502 and the packets are forwarded over network 500 to source node 502. Thus, when the return IP packets are sent from CE router 510, the source and destination address fields in the packets are as follows: src-ip: Y; dest-ip: S.

In this manner, in a normal operation segments of the TCP connection between source node 502 and destination node 552 are exchanged in IP packets through CE router 510 and over connection 521.

As noted above, systems and techniques are provided herein that can be used to provide NAT route distribution based on tag information in an SDWAN overlay network. In some embodiments, the systems and techniques can be used for the efficient selection and advertisement of NAT routes in an SDWAN fabric. For example, the systems and techniques can be used to implement symmetric networking between a remote site (e.g., associated with service side NAT) and a client site (e.g., associated with client side NAT). In some examples, symmetric networking can be provided to attract return traffic to the same edge router of the client side that originated the corresponding outbound traffic to the remote site. In some cases, symmetric networking is implemented for edge devices (e.g., edge routers) that are NAT'd behind a shared/same (e.g., overlapping) public NAT address in a NAT pool of a VPN spanning a set of customer sites within an SDWAN deployment.

NAT route distribution can be used to distribute NAT public addresses (e.g., selected from a NAT pool comprising a plurality of NAT public addresses) from client sites to remote sites using Overlay Management Protocol (OMP) or Border Gateway Protocol (BGP). NAT route distribution is widely used in SDWAN infrastructures to attract return traffic from remote locations (e.g., return traffic from the remote site to the client site). NAT route distribution maps multiple private addresses inside a local network (e.g., client site) to a single/shared public IP address, before their traffic is transferred onto the internet. The NAT route distribution technique works effectively to facilitate the attraction of return traffic from remote sites, only so long as the NAT pool addresses remain unique within the virtual private network (VPN) that spans across all the client sites in the SDWAN (e.g., all the client sites associated with the same enterprise user or tenant, etc.). As large-scale SDWAN deployments become increasingly common (e.g., with 1,000+ branches and 8,000+ edge devices), it becomes impractical to maintain the uniqueness of the NAT addresses within a VPN. When non-unique NAT pool addresses are utilized (e.g., when NAT pool addresses are re-used), these NAT addresses can be referred to as "overlapping" NAT addresses. Maintaining the uniqueness of the NAT addresses within a VPN requires preventing reuse of NAT addresses and/or preventing overlapping NAT addresses. In particular, when an enterprise user has many edge routers with overlapping NAT addresses, the existing approach of automatic distribution of NAT public addresses will result in route conflicts, and the automatic NAT public address distribution will fail due to next hop route conflicts.

Figure 6:
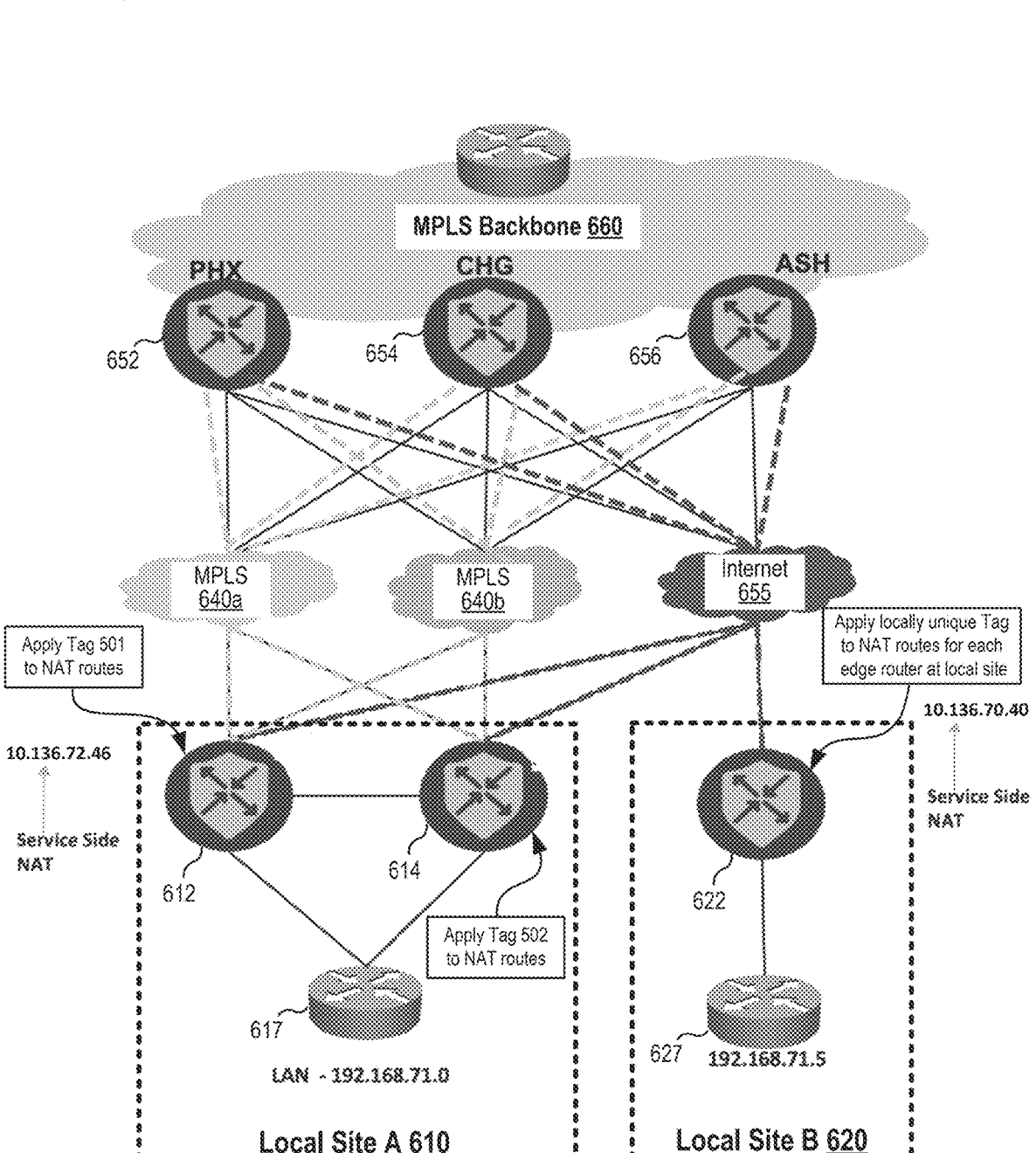
FIG. 6 illustrates an example of Network Address Translation (NAT) route tagging for symmetric network to and from local site edge routers in a software-defined wide-area network (SDWAN) overlay network, in accordance with some aspects of the present technology.

FIG. 6 is a diagram illustrating an example network deployment 600 utilizing NAT route tagging for symmetric networking to and from local site edge routers in an SDWAN overlay network, in accordance with some examples. The network deployment 600 can include a plurality of local sites (e.g., customer sites, enterprise user sites, etc.), such as the local site A 610, the local site B 620, etc. Each local site 610, 620 can include one or more edge routers. For instance, the local site A 610 includes a first edge router 612 and a second edge router 614; the local site B 620 includes at least a first edge router 622. It is appreciated that a greater quantity of edge routers may be utilized without departing from the scope of the present disclosure. The different local sites may include the same number of routers as other local sites, and/or may include a different number of routers as other local sites. As illustrated, the first local site 610 can utilize either one of edge router 612 or edge router 614 to provide a connection between a LAN 617 at the local site A and an MPLS backbone 660. The second local site 620 can utilize the edge router 622 to provide a connection between a LAN 627 at the local site B and the MPLS backbone 660. The various local sites 610, 620, . . . , etc. may each be associated with the same VPN (e.g., a same VPN spans across each respective local site 610, 620, . . . , included in the plurality of local sites of the example network deployment 600).

In some cases, the plurality of local sites 610, 620 can be connected to the MPLS backbone 660 based on software-defined networking and/or an overlay network. In some aspects, the example network deployment 600 can be an SDWAN deployment and/or overlay network deployment. As illustrated, the local site edge routers (e.g., 612, 614, 622) can communicate with one or more service-side edge routers (e.g., 652, 654, 656, etc.). In some cases, the different service-side edge routers may correspond with different respective regions, locations, geographical areas, etc. For instance, a first service-side edge router 652 "PHX" may be associated with a Phoenix, AZ region; a second service-side edge router 654 "CHC" may be associated with a Chicago, IL region; a third service-side edge router 656 "ASH" may be associated with an Ashburn, VA region; etc.

The local site edge routers 612, 614, 622 can be connected via an SDWAN fabric and/or overlay network to the service-side edge routers 652, 654, 656. In some cases, the local site edge routers and service-side edge routers may be connected through a first multiprotocol label switching (MPLS) network 640*a*, a second MPLS network 640*b*, through the public internet 655, etc. For instance, the first MPLS network 650*a* may be used to provide tunneling between either one of the local site A 610 edge routers (e.g., edge router 612, edge router 614) and each of the three service-side edge routers 652, 654, 656. As illustrated, the second MPLS network 650*b* may be used to provide tunneling between either one of the local site A 610 edge routers (e.g., edge router 612, edge router 614) and each of the three service-side edge routers 652, 654, 656. As illustrated, the public internet 655 may be used to provide tunneling or connectivity between any one of the three local site edge routers 612, 614, 622 and any one of the three service-side edge routers 652, 654, 656. The service-side edge routers 652, 654, 656 can be associated with and provide connectivity to/from MPLS backbone 660, etc.

In one illustrative example, the local sites 610, 620 are included in a single VPN spanning across the various local sites of the SDWAN, as noted previously above. Some SDWAN deployments may include hundreds or thousands of individual branches (e.g., local sites) and can include multiple thousands of edge devices (e.g., edge routers). As noted previously, it can be difficult and/or impractical to maintain the uniqueness of NAT addresses within such a VPN. For instance, the NAT addresses can be associated with a NAT pool (e.g., a pool or plurality of public NAT addresses) that is the same as or similar to one or more of the NAT pool 524 or the NAT pool 534 of FIG. 5, etc.

As illustrated, the example network deployment 600 of FIG. 6 may utilize overlapping NAT pool addresses for the respective edge routers located at some (or all) of the local sites of the plurality of local sites of the same VPN. For instance, the first local site A may implement NAT based on using the same NAT address (e.g., an overlapping NAT address) for both routes to/from the first edge router 612 and for routes to/from the second edge router 614. In the example of FIG. 6, any route originating from the local site A 610 is NAT'd behind the same NAT public IP address 10.136.72.46, regardless of whether the originating node is the first edge router 612 or the second edge router 614.

The second local site B 620 is shown as being NAT'd behind a different NAT pool address than the first local site A 610 (e.g., the edge router 622 is NAT'd behind the NAT public IP address 10.136.70.40).

In some cases, the presence of many edge routers with overlapping NAT addresses on the customer side (e.g., local site side) can cause the automatic distribution of NAT public addresses to result in route conflicts. In particular, the automatic distribution of NAT public addresses when edge routers share overlapping NAT address can cause the breakdown of symmetric networking within the SDWAN, as return traffic can be attracted to the appropriate local site that includes the originating edge router (e.g., based on unique NAT addresses advertised for the different local sites), but cannot be attracted to the specific edge router within the appropriate local site that acted as the originating router (e.g., based on each edge router at the local site being NAT'd behind the same/overlapping NAT address).

For instance, symmetric networking (also referred to as symmetric routing) is achieved when the same route is used for traffic from a customer router to a service-side router and for traffic from the service-side router to the customer router. Implementing and maintaining symmetric networking can be needed for stateful services, wherein the same router needs to see both sides of the network traffic (outgoing and incoming) or else the stateful service will break. More generally, symmetric routing refers to the principle that packets should take the same path in both the forward and reverse directions between a source and destination. There is a particular need for symmetric routing in many SDWAN environments and deployments. For example, a benefit of SDWAN is its ability to perform intelligent path selection based on various metrics (e.g., latency, jitter, packet loss, etc.). Symmetric routing can therefore be used to ensure that the selected path attributes are consistent in both directions, by using the same path in both directions. Consistent path attributes can improve or otherwise make quality-of-service (QOS) delivered by the SDWAN more predictable, which can be of particular importance for various applications and use cases such as voice over IP (VOIP), video conferencing, etc. In such examples and use cases, asymmetric paths (e.g., asymmetric routing) with different path characteristics or attributes on the forward and reverse directions between the source and destination can lead to issues such as call quality degradation, packet reordering, etc.

Symmetric routing can also be needed for improved security. For instance, many advanced security features, such as stateful packet inspection and intrusion detection and prevention systems, rely on examining both incoming and outgoing packets to make an informed analysis and decision as to the presence of security threats or issues. Asymmetric routing can break the stateful nature of these security mechanisms, thereby making it difficult or impossible to track the state of a connection (and thereby weakening the security posture on the asymmetric routes and/or SDWAN). In another example, NAT services and firewall configurations within the SDWAN may often assume that the return path of a packet (e.g., a packet returning from MPLS backbone 660 to a respective customer router within one of the local sites 610, 620, . . . , etc., that initiated a transmission to MPLS backbone 660) will traverse the same intermediate nodes as the forward path. Symmetric routing can ensure that this assumption taken by many NAT services and firewall configurations will hold true, and can therefore avoid potential network issues such as session termination due to NAT and/or firewall timeouts. There is a need to avoid session termination in SDWAN deployments that span across multiple branches and include cloud-based resources, where NAT services and firewalls are common.

Accordingly, it is contemplated that the systems and techniques described herein can be used to implement symmetric routing based on applying unique attribute or tag information to the NAT routes corresponding to each respective edge router within a given one of the local sites 610, 620, etc. In one illustrative example, the tag information can be locally unique within each respective local site of the plurality of local sites, but may be globally reused across different local sites (e.g., may be globally reused for local sites having a different NAT public address).

For instance, by appending locally unique (e.g., no reuse or overlap within the same local site 610 or 620) tag information to the NAT routes advertised by each edge router within the local site, the respective local site edge routers become uniquely identifiable based on having a unique combination of {overlapping NAT public address, unique tag information}. For instance, each local site edge router at the first local site 610 is NAT'd to the same/overlapping NAT address 10.136.72.46, which on its own cannot be used to enable symmetric networking to the local site edge routers-only to the local site 610.

By applying a different tag value or attribute to each edge router within local site A 610 (e.g., edge router 612 and edge router 614), the corresponding NAT routes for each edge router become uniquely identifiable for purposes of symmetric networking. For instance, NAT routes associated with the first edge router 612 can be tagged using a "tag 501" value. NAT routes associated with the second edge router 614 can be tagged using a "tag 502" value, etc. In this manner, NAT routes for different edge routers behind the same NAT address become uniquely identifiable. Routes to/from the first edge router 612 are associated with the unique combination of {10.136.72.46, tag 501} and routes to/from the second edge router 614 are associated with the unique combination of {10.136.72.46, tag 502}.

The edge routers at local site B 620 (e.g., edge router 622, etc.) may reuse the tag 501, tag 502, . . . , etc., tag values applied at local site A 610, based on the local site B 620 using a different NAT public address than that of the local site A 610. For instance, routes to/from edge router 622 can be uniquely identifiable based on the unique combination of 10.136.70.40 with any tag value.

For example, {10.136.70.40, tag 501} is a unique combination even though tag 501 is reused across local site A and local site B, because local site B uses a different NAT public address. Similarly, {10.136.70.40, tag 502} is also a unique combination despite the reuse of tag 502 across local site A and local site B, again because local site B uses a different NAT public address than local site A. In a still further example, {10.136.70.40, tag n} would be a unique combination for any value of n, because (within the context of the example of FIG. 6), no other local site or edge routers are NAT'd to the NAT public address 10.136.70.40 that is used for the local site B 620.

In some aspects, the systems and techniques described herein can be used to define attributes or tags to the NAT routes corresponding to each unique edge router of a local site, such that the routes can be imported or exported to the remote sites selectively using a control policy. In some examples, an aggregate summary of the tagged NAT routes can be generated using overlay management protocol (OMP). For instance, the aggregate summary of tagged NAT routes can be used to summarize all of the automatically redistributed NAT prefixes for the local sites 610, 620 and/or edge routers 612, 614, 622.

In some embodiments, a single aggregate IP address prefix can be created for the overlapping NAT routes that are associated with the same NAT address. Aggregation may be performed on device (e.g., an edge router or SDWAN router). For instance, aggregation and/or NAT prefix automatic redistribution can be performed by some (or all) of the local site edge routers 612, 614, 622. In some examples, aggregation may additionally, or alternatively, be performed by an SDWAN controller associated with an SDWAN fabric and/or associated with the SDWAN deployment (e.g., such as an SDWAN deployment associated with FIG. 6, etc.).

In some aspects, the application of the NAT route tag information allows for the creation and implementation of policies in the SDWAN controller. In some cases, an aggregate summary of all auto-redistributed NAT prefixes can be created via OMP. The far-end routers (e.g., SDWAN routers that connect to the enterprise edge routers after NAT route distribution) can apply configured control policies to match on the static NAT route tags. In some embodiments, the configured control policies are applied by the SDWAN controller that sits between the customer edge routers and the far-end routers—the SDWAN controller applies the control policies matching the static NAT route tags, and sends the traffic on to the far-end routers in an appropriate manner. In some examples, the SDWAN controller is connectable to all routes in the SDWAN. Policy can be applied on incoming traffic from the far-end routers to the customer edge routers, can be applied on outgoing traffic from the customer edge routers to the far-end routers, or both. In some examples, the NAT route tag can be a numerical value. The tag numerical value can be translated by the SDWAN controller, such that the tag information is not seen by the SDWAN far-end routers or the customer edge routers, and the NAT route tagging described herein can be implemented seamlessly with existing NAT devices without breaking functionality. In some embodiments, by advertising NAT routes with a tag for traffic coming from the SDWAN controller (forwarded from the edge routers to far-end routers), the SDWAN controller can later directly match the NAT route tag to discriminate the preferred router to return the traffic back to the edge routers.

In one illustrative example, a first static route can be created with a tag value and a second static route can be created with the same tag value:

ip route vrf 10 10.134.214.45 255.255.255.255 Null tag 501
ip route vrf 10 10.134.214.46 255.255.255.255 Null tag 501

Subsequently, aggregate prefixes can be created for the static routes associated with the same tag value:

ip route vrf 10 10.134.214.44 255.255.255.252 Nul10 tag 501

In some cases, the aggregate prefix information with NAT route tag information can be signaled and/or otherwise communicated via OMP:

```
omp
    no shutdown
    send-path-limit                    16
    ecmp-limit                         16
    graceful-restart
    no as-dot-notation
    timers
        holdtime                       60
        advertisement-interval         1
        graceful-restart-timer         43200
        eor-timer                      300
    exit
    address-family ipv4 vrf 10
        advertise static route-map STATIC_TO_OMP
        advertise aggregate 10.134.214.44/30 aggregate-only
```

In some aspects, based on the selective advertisement and distribution of tagged NAT routes with aggregate prefix information, a far-end router (e.g., edge router 652, 654, 656) can apply a corresponding and/or configured control policy to match on the static route tag:

```
control-policy hub-policy          sequence 41
sequence 1                         match route
match tloc                         omp-tag 502
site-list Hubs                     color-list private
action reject                      prefix-list_Anylpv4PrefixList
sequence 11                        action accept
match tloc                         sequence 51
action accept                      match route
sequence 21                        omp-tag 501
match route                        color-list biz-inet
site-list Hubs                     prefix-list_Anylpv4Prefix List
prefix-list_Anylpv4PrefixList      action accept
action reject                      set
sequence 31                        preference 35
match route                        match route
omp-tag 501                        color-list biz-inet
color-list private                 prefix-list_Anylpv4PrefixList
prefix-list_Anylpv4PrefixList      action accept
action accept                      set
set                                preference 25
preference 40                      sequence 71
                                   match route
                                   prefix-list_Anylpv4PrefixList
                                   action accept
                                   default-action accept
```

In some embodiments, the systems and techniques can be used to implement selective redistribution of NAT routes from a local/customer site to a remote site, using a NAT route tag or attribute and/or using control policy corresponding to the NAT route tag information and implemented by an SDWAN or overlay network controller. In some aspects, an SDWAN network control can be configured to learn and tag the NAT routes associated with the corresponding edge routers of various local sites of a plurality of local sites on a same VPN in an SDWAN overlay network.

In some aspects, tagging NAT routes can be seen to provide a more scalable solution for NAT route distribution and/or NAT implementation in large-scale SDWAN deployments (e.g., with 1,000+ branches and 8,000+ edge devices, among various other values, etc.).

For instance, in one illustrative example, based on the systems and techniques described herein, a NAT address pool that includes a quantity Q of different NAT addresses (e.g., Q different/unique NAT public IP addresses available for use) can be configured to support an increased amount of connected devices equal to Q*(no. of unique tags defined). Without the use of NAT route tagging, the NAT address pool may support a lesser amount of connected devices before symmetric networking fails and/or before automatic distribution of NAT public addresses results in route conflicts (e.g., without the use of NAT route tagging, the NAT address pool may support only Q connected devices before symmetric networking fails or becomes impossible to achieve in a consistent and predictable manner).

In some aspects, NAT routes and/or aggregated NAT route prefixes can be tagged at an edge device (e.g., local site edge router/originating router). Tagging NAT routes at the edge-devices or edge routers may be seen to reduce workload at an SDWAN controller, and to reduce the number of routes needed for a given number of devices in the SDWAN. In some aspects, NAT route tagging can be performed through configuration at edge devices and applied at the SDWAN controller.

FIG. 7 illustrates a flowchart of an example process 700 for implementing symmetric routing in an SDWAN and/or overlay network based on automatically applying locally unique tag information to each edge router NAT'd behind a same (e.g., overlapping) NAT pool address. For instance, the edge routers may be NAT'd behind a same or overlapping NAT pool address at the same on-premises or branch site (e.g., such as local site A 610 of FIG. 6, local site B 620 of FIG. 6, etc.).

It is understood that the example process 700 of FIG. 7 and/or various other processes described herein can also be implemented using one or more processors and memories having computer-readable instructions stored thereon, which when executed by the one or more processors cause the one or more processors to perform operations including some or all of process 700. Although process 700 depicts a particular sequence of operations, the sequence may be altered without departing from the scope of the present disclosure. For example, some of the operations depicted may be performed in parallel or in a different sequence that does not materially affect the function of process 700. In other examples, different components of an example device or system that implements process 700 may perform functions at substantially the same time or in a specific sequence.

At block 702, the process 700 includes determining a plurality of Network Address Translation (NAT) routes associated with respective edge routers included in a same virtual private network (VPN) for communicating with a software-defined wide area network (SDWAN).

For instance, the plurality of NAT routes can include respective NAT routes between an edge router 612, 615, 622 of FIG. 6 and a remote-site edge router 652, 654, 656 of FIG. 6. In some cases, the respective NAT routes can be between respective edge routers of respective local sites, such as local site A 610 and/or local site B 620 of FIG. 6. In some cases, the respective NAT routes can be from a local site to one of MPLS 640a, MPLS 640b, and/or public internet 655 of FIG. 6. In some examples, the respective NAT routes can be from a local site to the MPLS backbone 660 of FIG. 6.

At block 704, the process 700 includes identifying a first subset of the plurality of NAT routes as mapped to a first public NAT address included in a NAT pool associated with the VPN. For instance, the first subset can be the same as or similar to NAT routes corresponding to the first edge router 612 and second edge router 614 of FIG. 6, which are included in the same local site A 610 and are mapped to the same public NAT address 10.136.72.46 included in a NAT pool associated with the VPN of FIG. 6. In some aspects, the first subset of the plurality of NAT routes comprises NAT routes associated with respective edge routers included in a same local site of the VPN or SDWAN. A second subset of the plurality of NAT routes can comprise NAT routes associated with respective edge routers included in the local site B 620 of FIG. 6, etc.

At block 706, the process 700 includes tagging each NAT route of the first subset with a tag value indicative of a preferred router for receiving return traffic of the NAT route. For instance, NAT routes from the first edge router 612 can be tagged with a tag value 501, indicative of the first edge router 612 as the preferred router for receiving all return traffic of a NAT route with tag value 501. NAT routes from the second edge router 614 can be tagged with a different tag value, such as tag value 502, indicative of the second edge router 614 as the preferred router for receiving all return traffic of a NAT route with tag value 502, etc.

In some cases, each NAT route associated with a particular public NAT address included in the NAT pool is tagged with a tag value uniquely corresponding to an identity of the respective edge router configured as a source of the NAT route. In some cases, each NAT route associated with a particular local site of a plurality of local sites is tagged with a tag value uniquely corresponding to an identity of the respective edge router configured as a source of the NAT route. In some cases, NAT route tag values are not reused within a same local site of the VPN or SDWAN. In some cases, NAT route tag values are reused across different local sites of the VPN or SDWAN.

In some examples, tagging each NAT route includes appending a respective tag value that is locally unique within a local site of a source edge router corresponding to each NAT route. In some embodiments, tagging each NAT route can include distributing overlay management protocol (OMP) information indicative of aggregate NAT route prefix information and respective tag value information.

In some aspects, a corresponding tag value is appended to each NAT route of the plurality of NAT routes, the corresponding tag value indicative of a control policy for selective import or export to one or more remote sites. In some aspects, a corresponding tag value is appended to each aggregate prefix of one or more aggregate prefixes determined for the first subset of NAT routes, and wherein the one or more aggregate prefixes are determined based on shared tag values.

At block 708, the process 700 includes routing traffic on a respective NAT route of the plurality of NAT routes based on applying, at an SDWAN controller, a corresponding control policy matching the tag value of the respective NAT route.

Figure 8:
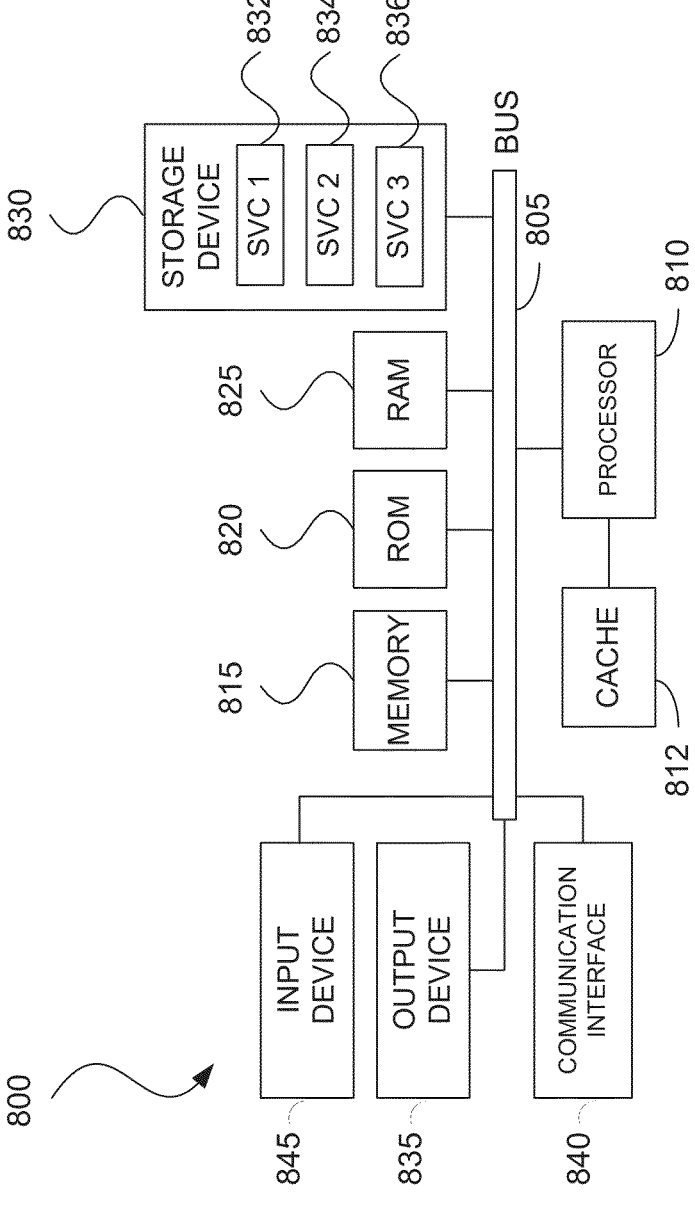
FIG. 8 is a block diagram illustrating an example of a computing system for implementing aspects of the present technology and aspects described herein.

FIG. 8 illustrates a computing system architecture, according to some aspects of the present disclosure. Components of computing system architecture 800 are in electrical communication with each other using a connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

What is claimed is:

1. A method comprising:

determining a plurality of Network Address Translation (NAT) routes associated with one or more edge routers included in a virtual private network (VPN) for communicating with a software-defined wide area network (SDWAN);

identifying a first NAT route and a second NAT route mapped to a first public NAT address associated with the VPN;

tagging the first NAT route with a first tag value and the second NAT route with a second tag value, each tag value indicative of a preferred router for receiving return traffic of the respective NAT route; and routing traffic on the first NAT route of the plurality of NAT routes based on applying, at an SDWAN controller, a control policy matching the first tag value of the first NAT route.

2. The method of claim 1, wherein the first tag value and second tag value uniquely correspond to an identity of the respective edge router configured as a source of the respective NAT route.

3. The method of claim 1, further comprising routing traffic on the second NAT route of the plurality of NAT routes based on applying, at an SDWAN controller, a control policy matching the second tag value of the second NAT route.

4. The method of claim 1, wherein NAT route tag values are not reused within a local site of the VPN or SDWAN.

5. The method of claim 1, wherein tagging the first NAT route includes:

appending the first tag value that is locally unique within a local site of a source edge router corresponding to the first NAT route; and distributing overlay management protocol (OMP) information indicative of aggregate NAT route prefix information and tag value information.

6. The method of claim 1, wherein the first NAT route and the second NAT route are associated with respective edge routers included in a local site of the VPN or SDWAN.

7. The method of claim 1, wherein a corresponding tag value is appended to each aggregate prefix of one or more aggregate prefixes, and wherein the one or more aggregate prefixes are determined based on shared tag values.

8. A system comprising:

one or more processors; and one or more computer-readable storage media having computer-readable instructions stored thereon, wherein the computer-readable instructions, when executed by the one or more processors, cause the one or more processors to:

determine a plurality of Network Address Translation (NAT) routes associated with one or more edge routers included in a virtual private network (VPN) for communicating with a software-defined wide area network (SDWAN);

identify a first NAT route and a second NAT route mapped to a first public NAT address associated with the VPN;

tag the first NAT route with a first tag value and the second NAT route with a second tag value, each tag value indicative of a preferred router for receiving return traffic of the respective NAT route; and route traffic on the first NAT route of the plurality of NAT routes based on applying, at an SDWAN controller, a control policy matching the first tag value of the first NAT route.

9. The system of claim 8, wherein the first tag value and the second tag value uniquely correspond to an identity of the respective edge router configured as a source of the respective NAT route.

10. The system of claim 8, further comprising routing traffic on the second NAT route of the plurality of NAT routes based on applying, at an SDWAN controller, a control policy matching the second tag value of the second NAT route.

11. The system of claim 8, wherein NAT route tag values are not reused within a local site of the VPN or SDWAN.

12. The system of claim 8, wherein tagging the first NAT route includes:

appending the first tag value that is locally unique within a local site of a source edge router corresponding to the first NAT route; and distributing overlay management protocol (OMP) information indicative of aggregate NAT route prefix information and tag value information.

13. The system of claim 8, wherein the first NAT route and the second NAT route are associated with respective edge routers included in a local site of the VPN or SDWAN.

14. The system of claim 8, wherein a corresponding tag value is appended to each aggregate prefix of one or more aggregate prefixes, and wherein the one or more aggregate prefixes are determined based on shared tag values.

15. One or more non-transitory computer-readable media comprising computer-readable instructions, which when executed by one or more processors, cause the one or more processors to:

determine a plurality of Network Address Translation (NAT) routes associated with one or more edge routers included in a virtual private network (VPN) for communicating with a software-defined wide area network (SDWAN);

identify a first NAT route and a second NAT route mapped to a first public NAT address associated with the VPN;

tag the first NAT route with a first tag value and the second NAT route with a second tag value, each tag value indicative of a preferred router for receiving return traffic of the respective NAT route; and route traffic on the first NAT route of the plurality of NAT routes based on applying, at an SDWAN controller, a control policy matching the first tag value of the first NAT route.

16. The one or more non-transitory computer-readable media of claim 15, wherein the first tag value and second tag value uniquely correspond to an identity of the respective edge router configured as a source of the respective NAT route.

17. The one or more non-transitory computer-readable media of claim 15, further comprising routing traffic on the second NAT route of the plurality of NAT routes based on applying, at an SDWAN controller, a control policy matching the second tag value of the second NAT route.

18. The one or more non-transitory computer-readable media of claim 15, wherein NAT route tag values are not reused within a local site of the VPN or SDWAN.

19. The one or more non-transitory computer-readable media of claim 15, wherein tagging the first NAT route includes:

appending the first tag value that is locally unique within a local site of a source edge router corresponding to the first NAT route; and distributing overlay management protocol (OMP) information indicative of aggregate NAT route prefix information and tag value information.

20. The one or more non-transitory computer-readable media of claim 15, wherein the first NAT route and the second NAT route are associated with respective edge routers included in a local site of the VPN or SDWAN.

* * * * *